(12) United States Patent
Liao

(10) Patent No.: US 6,648,487 B2
(45) Date of Patent: Nov. 18, 2003

(54) ILLUMINATION DEVICE FOR PALMTOP GAME MACHINE

(76) Inventor: Chun-Chi Liao, 6F, No. 15-2, Lane 420, Sec. 5, Cheng-Kung Road, Nei Hu Area, Taipei (TW)

( * ) Notice: Subject to any disclaimer, the term of this patent is extended or adjusted under 35 U.S.C. 154(b) by 32 days.

(21) Appl. No.: 10/033,453

(22) Filed: Dec. 27, 2001

(65) Prior Publication Data
US 2003/0123250 A1 Jul. 3, 2003

(51) Int. Cl.[7] .............................. F21V 21/10; A47B 5/06
(52) U.S. Cl. ........................ 362/85; 362/109; 362/223; 362/368
(58) Field of Search .......................... 362/85, 109, 217, 362/221–223, 260, 362, 368, 374, 375

(56) References Cited

U.S. PATENT DOCUMENTS

| | | | | |
|---|---|---|---|---|
| 4,538,217 A | * | 8/1985 | Ewing et al. ................ | 362/375 |
| 4,546,418 A | * | 10/1985 | Baggio et al. ................ | 362/85 |
| 5,115,383 A | * | 5/1992 | Lee ............................. | 362/109 |
| 5,381,322 A | * | 1/1995 | Humphreys .................. | 362/221 |
| 5,695,278 A | * | 12/1997 | Grossman et al. ........... | 362/374 |
| 5,727,861 A | * | 3/1998 | Motohashi ................... | 362/223 |
| 6,364,273 B1 | * | 4/2002 | Otema .......................... | 362/223 |

* cited by examiner

Primary Examiner—Alan Cariaso

(57) ABSTRACT

An illumination device mainly comprises a front housing, a rear housing, an illumination set and a light-unification lamp shield. A front lamp holder and a rear lamp holder are disposed on a top edge of the front housing and the rear housing respectively, and a white-ray fluorescent tube is connected to the rear end of the illumination set, which is located between the front housing and the rear housing. The fluorescent tube in the illumination set is extendedly buried between the front lamp holder and the rear lamp holder for emanating light onto a screen of the game machine without reflection.

1 Claim, 5 Drawing Sheets

ILLUMINATION DEVICE FOR PALMTOP GAME MACHINE

FIELD OF THE INVENTION

This invention relates generally to an illumination device, particularly to an illumination device for palmtop game machine.

BACKGROUND OF THE INVENTION

As the palmtop game machine so far available in market cannot be played in a dim place because of insufficient light, thus an illumination device shown in FIG. 1 has been proposed and presented recently.

The known illumination device (2) is mainly composed of a scrollable illumination rack (21) and a magnification lens (22) laid on a game machine (1). However, because the light source mounted on the illumination rack (21) is made by gathering a plurality of bulbs, hence, in addition to uneven luminosity on the screen, the inverse image of those bulbs would surely make a player dizzy, and the situation is worsened by the reflection rays of the magnification lens. Thus, in view of above said defects, an illumination device of this invention for palmtop game machine is proposed as a better option.

SUMMARY OF THE INVENTION

The primary object of this invention is to provide an illumination device for palmtop game machine that can eliminate light reflection from a screen of the game machine.

In order to realize the object, the illumination device mainly comprises a front housing, a rear housing, an illumination set and a light-unification lamp shield. A front lamp holder and a rear lamp holder are disposed on a top edge of the front housing and the rear housing respectively. A white-ray fluorescent tube is connected to the rear end of the illumination set, which is located between the front housing and the rear housing. The fluorescent tube in the illumination set is extendedly buried between the front lamp holder and the rear lamp holder for emanating light onto a screen of the game machine without reflection. The bottom end of the rear housing is extended downwardly to form a pair of symmetrical feet, in which the bottom end of each foot is folded to become an anchoring plate having a fixing button, and a connection block is disposed properly in the central portion of each foot so that the illumination device of this invention can be directly snap-fastened to a predetermined fixing portion of the game machine.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
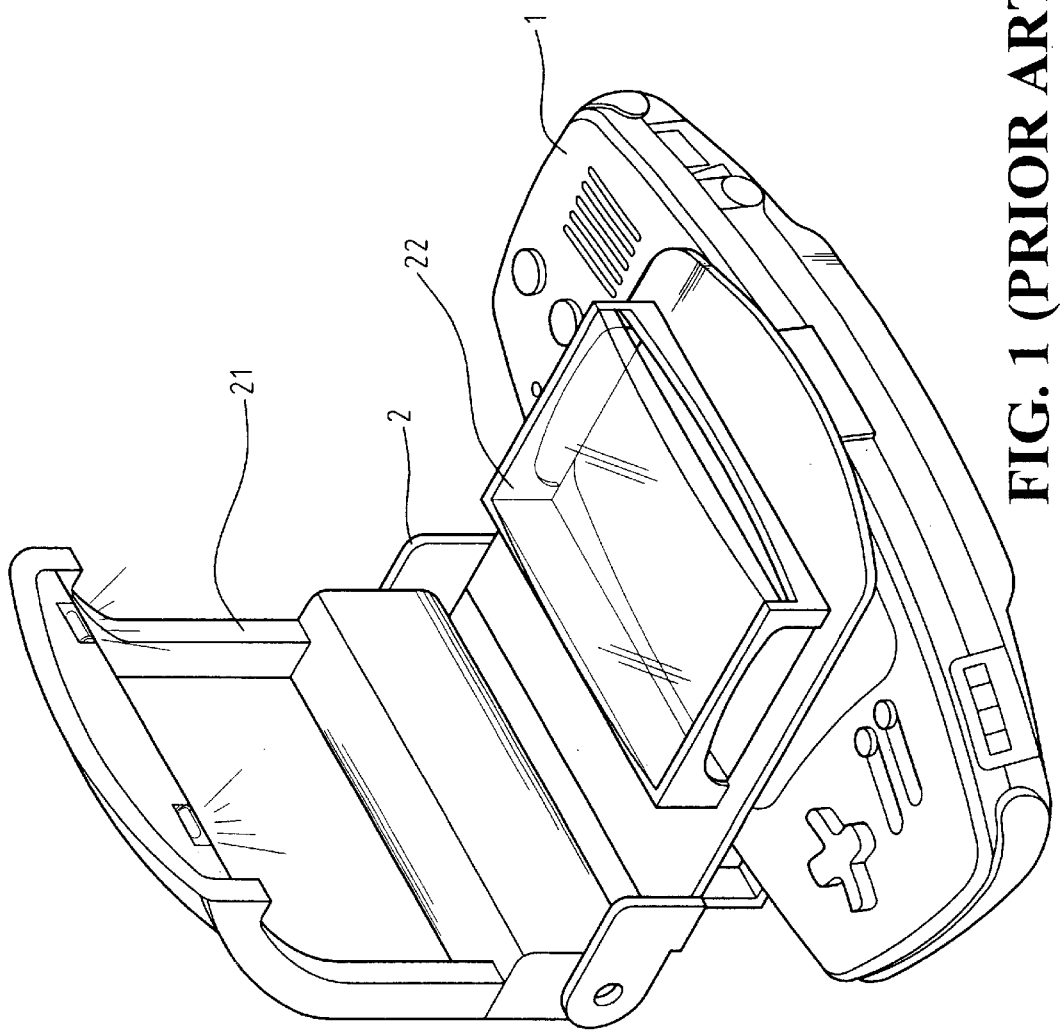
FIG. 1 shows a conventional game machine, which is combined with an illumination device.
Figure 2:
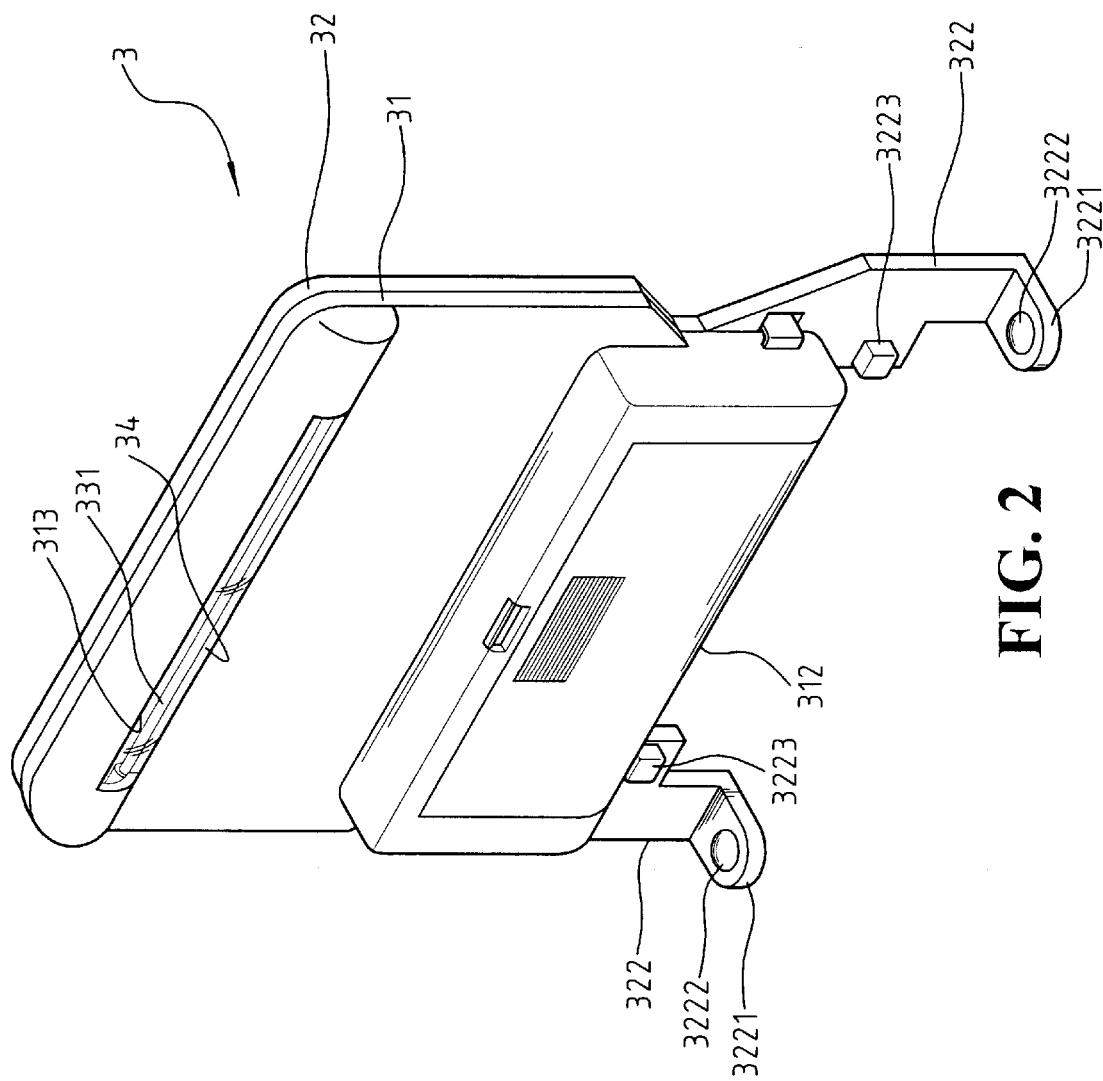
FIG. 2 is a schematic view of this invention in three dimensions.
Figure 3:
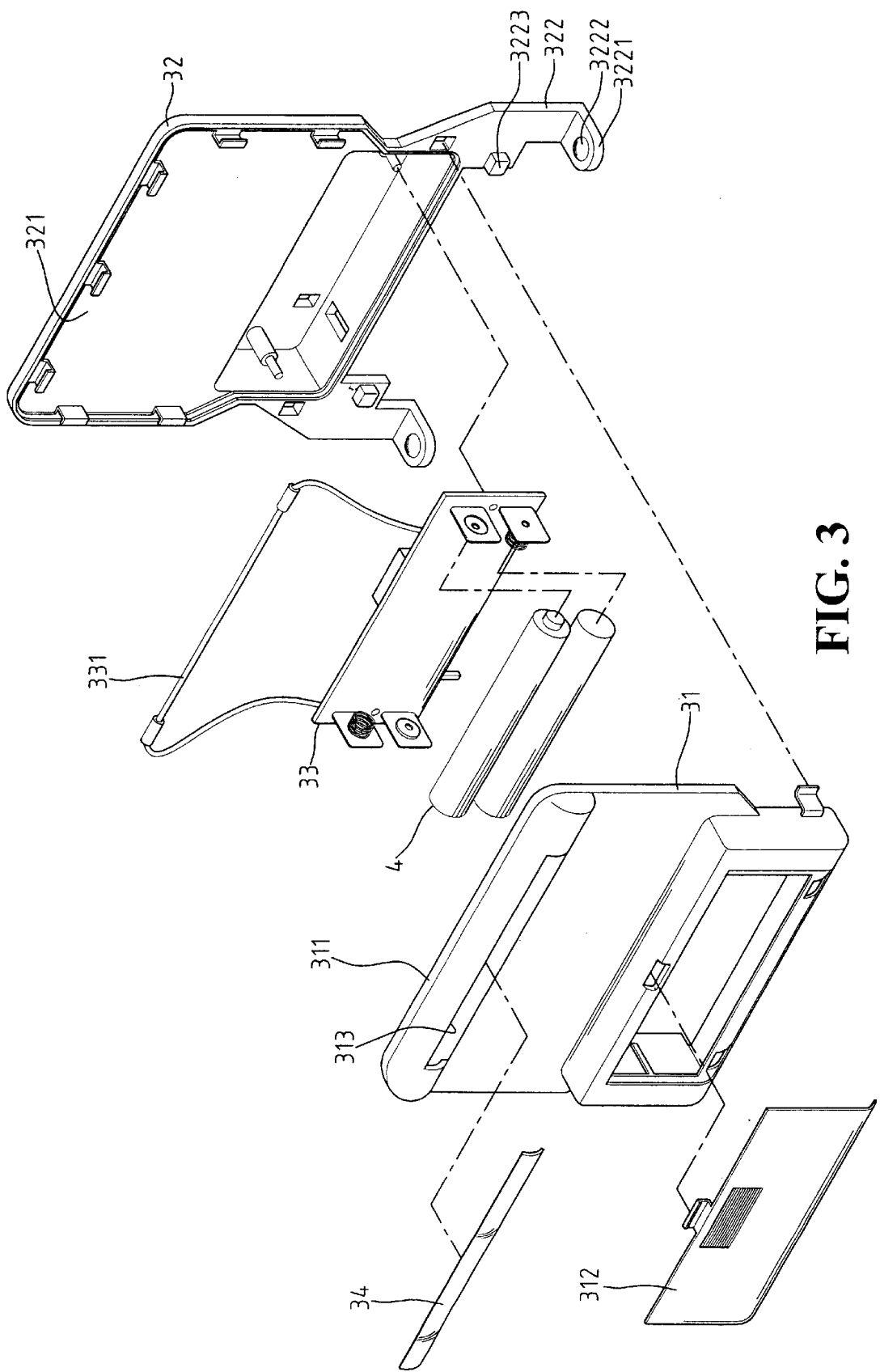
FIG. 3 is an exploded view of this invention in three dimensions.

As illustrated in FIGS. 2 and 3, an illumination device of this invention for palmtop game machine (3) mainly comprises a front housing (31), a rear housing (32), an illumination set (33), and a light-unification lamp shield (34). The front housing and the rear housing (31, 32) are to be combined together, in which a front lamp holder and a rear lamp holder (311, 321) are disposed on a top edge of the front housing and the rear housing (31, 32) respectively. A white-ray fluorescent tube (331) is connected to the rear end of the illumination set (33), which is located between the front housing and the rear housing (31, 32). A battery pack (4) is placed in the illumination set (33) to serve for a power supply and is shielded by a battery cover (312), and the fluorescent tube (331) in the illumination set (33) is extendedly buried between the front lamp holder and the rear lamp holder (311, 321). Moreover, a lamp-shield slot (313) is formed in a front edge of the front lamp holder (311) for snap-retaining the lamp shield (34) so that the light of the fluorescent tube (331) might uniformly shine on the screen of a palmtop game machine (1) without reflection. The bottom edge of the rear housing (32) is extended downwardly to form a pair of symmetrical feet (322), in which the bottom end of each foot is bent to become an anchoring plate (3221) having a fixing button (3222), and a connection block (3223) is disposed properly in the central portion of each foot (322) such that the illumination device (3) of this invention can be easily and smoothly mounted on the palmtop game machine (1).

Figure 4:
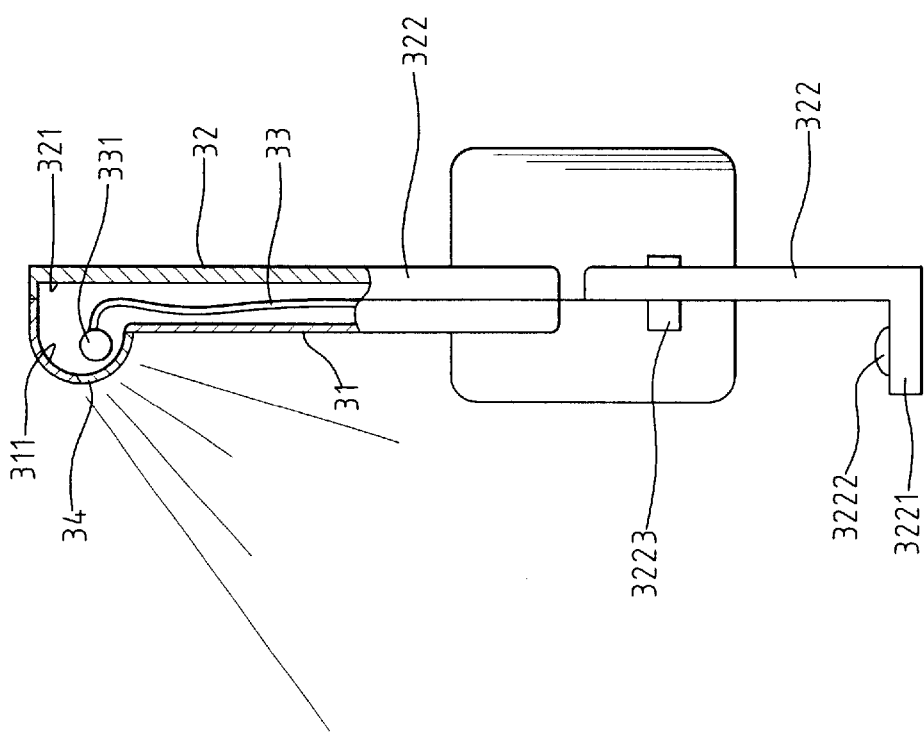
FIG. 4 is a cutaway sectional view of this invention.
Figure 5:
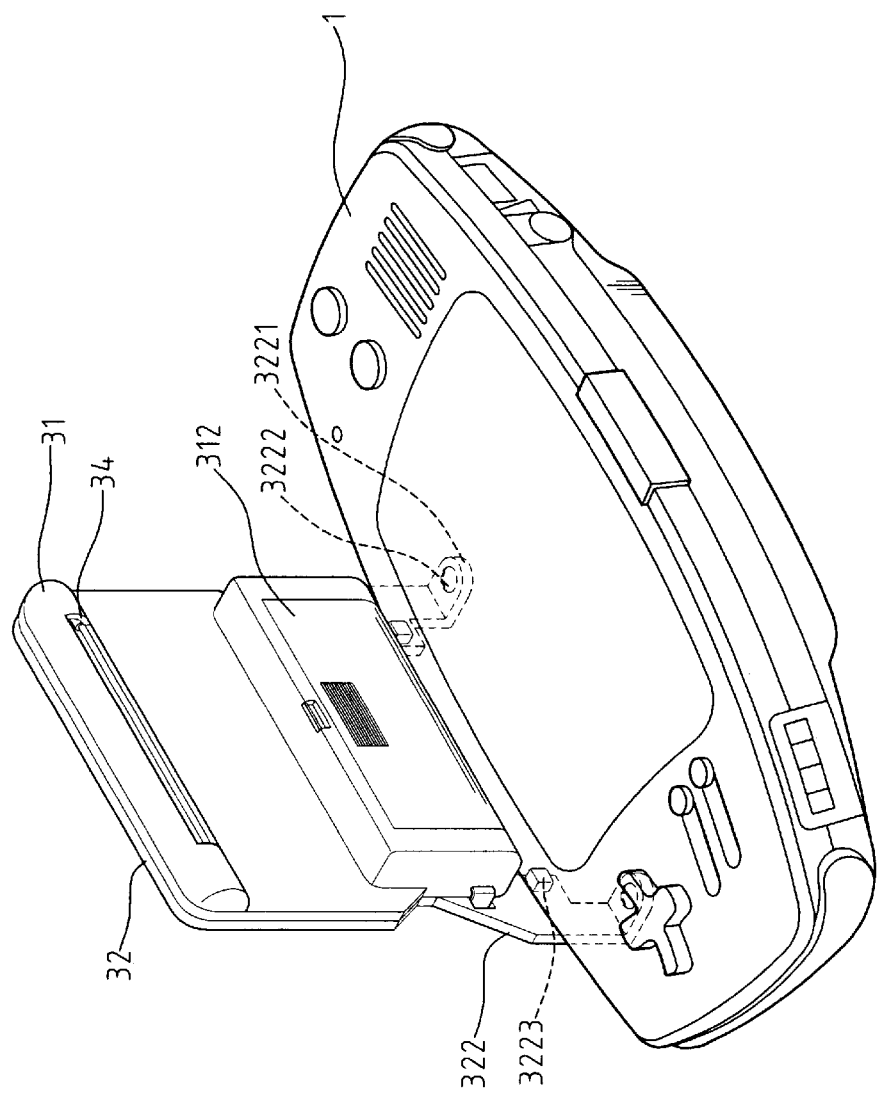
FIG. 5 shows an embodiment of this invention.

Referring now to FIGS. 4 and 5, as the extended fluorescent tube (331) of the illumination set (33) is mounted between the front housing and the rear housing (311, 321) and the transparent light-unification lamp shield (34) is snap-retained in the lamp-shield slot (313) as mentioned. Thus, after the illumination device (3) of this invention is installed at a rear lateral verge of the palmtop game machine (1), an angle is formed between the lamp shield (34) and the screen of the game machine (1) so that the fluorescent tube (331) would produce no inverse dizzy image directly on the screen. Also, because of the fluorescent tube (331) and the associated light-unification lamp shield (34), the incident light can be uniformly distributed on the screen without reflection to thereby promote visual effect of a player. And, as the bottom edge of the rear housing (32) is extended downwardly to form a pair of symmetrical feet (322), in which the bottom end of each foot is folded to become an anchoring plate (3221) having a fixing button (3222), and a connection block (3223) is disposed properly in the central portion of each foot (322) so that the illumination device (3) of this invention can be directly snap-fastened to a predetermined fixing portion (a regular design of the game machine) of the palmtop game machine (1). Then, a clamping function is created to the anchoring plate (3221) via the top edge of the connection block (3223) to prevent the illumination device (3) of this invention from swaying or turning upside down.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. An illumination device for a palmtop game machine, comprising:

a front housing to be combined with a rear housing, in which a front lamp holder is disposed on a top edge of the front housing, and a lamp-shield slot is formed in a front edge of the front lamp holder;

a rear housing to be combined with the front housing, in which a rear lamp holder is disposed on a top edge of the rear housing, and a bottom end of the rear housing is extended downwardly to form a pair of symmetrical feet;

an illumination set having its rear end connected with a white-ray fluorescent tube, which is located between the front housing and the rear housing; the white-ray fluorescent tube being extendedly buried between the front lamp holder and the rear lamp holder; and a light-unification lamp shield being snap-retained at the lamp-shield slot;

wherein a bottom end of each foot of the rear housing is folded to become an anchoring plate having a fixing button, and a connection block is disposed in a central portion of each foot.

* * * * *